US012066167B1

(12) United States Patent
Chen

(10) Patent No.: US 12,066,167 B1
(45) Date of Patent: Aug. 20, 2024

(54) DECORATIVE LAMP STRING

(71) Applicant: Guangdong Lianrun Intelligent Technology Co., Ltd., Guangdong (CN)

(72) Inventor: Kunpeng Chen, Jiujiang (CN)

(73) Assignee: GUANGDONG LIANRUM INTELLIGENT TEC, Huizhou (CN)

( * ) Notice: Subject to any disclaimer, the term of this patent is extended or adjusted under 35 U.S.C. 154(b) by 0 days.

(21) Appl. No.: 18/435,997

(22) Filed: Feb. 7, 2024

(30) Foreign Application Priority Data

Jan. 22, 2024 (CN) ......................... 202420160784.3

(51) Int. Cl.

| | |
|---|---|
| ***F21S 4/10*** | (2016.01) |
| ***F21V 3/00*** | (2015.01) |
| ***F21V 17/00*** | (2006.01) |
| ***F21V 17/06*** | (2006.01) |
| ***F21V 17/16*** | (2006.01) |

(52) U.S. Cl.
CPC .............. *F21V 17/002* (2013.01); *F21S 4/10* (2016.01); *F21V 3/00* (2013.01); *F21V 17/06* (2013.01); *F21V 17/164* (2013.01)

(58) Field of Classification Search
None
See application file for complete search history.

(56) References Cited

FOREIGN PATENT DOCUMENTS

CN 216924088 U * 7/2022

* cited by examiner

*Primary Examiner* — Fatima N Farokhrooz
(74) *Attorney, Agent, or Firm* — Justin Lampel

(57) ABSTRACT

The present disclosure relates to a decorative lamp string, which relates to the technical field of lamp strings. The lamp holder and lampshade of each decorative lamp of the decorative lamp string are connected through connecting pieces, and detachable assembling between the lampshade and lamp holder is achieved, so that users can quickly change different lampshades according to different needs, thus improving the diversity and universality of the decorative lamp string.

9 Claims, 6 Drawing Sheets

DECORATIVE LAMP STRING

TECHNICAL FIELD

The present disclosure relates to the technical field of lamp strings, and specifically relates to a decorative lamp string.

BACKGROUND

With the continuous improvement of people's living standards, in different usage requirements and occasions, it is required to have a lamp string that meets the usage requirements and matches the usage situation as an ambient or landscape lamp, to enhance the atmosphere or add beauty. It is an indispensable lighting fixture for decoration and is widely used in parks, squares, residential areas, streets, courtyards, etc.

In traditional decorative lamp strings, corresponding lampshades for shaping are often needed for different holiday scenes, such as skull lampshades for Halloween and lantern lampshades for New Year's Eve. However, most of the existing decorative lamp strings use an integrated structure between the lampshade and the lamp holder, which makes it impossible to disassemble the lampshade. Therefore, it is not possible to change lampshades with different shapes according to holiday scenes. Therefore, improvements are needed.

SUMMARY

The purpose of the present disclosure is to provide a decorative lamp string aiming at the shortcomings and deficiencies of the prior art, which has the advantages of convenience in transportation, easiness in assembling and disassembling, and easiness and quickness in lampshade change.

In order to achieve the above purpose, the present disclosure adopts the following technical solution:

A decorative lamp string, including a plurality of spliceable decorative lamps, each decorative lamp including: a light emitting unit; a lamp holder connected with the light emitting unit and used for connecting adjacent decorative lamps or being connected with an external power supply; a lampshade connected with the lamp holder and provided on the light emitting unit in a covering manner; and a connecting piece with one part provided on the lamp holder in a sleeving manner and the other part connected with the lampshade, the connecting piece being used for achieving detachable assembling between the lampshade and the lamp holder.

In an embodiment, the connecting piece includes: a sleeve ring provided on the lamp holder in a sleeving manner and being elastically deformable; and a clamping arm with elasticity, one end of the clamping arm being connected with the sleeve ring, the other end being able to get away from or close to the lamp holder to enable the sleeve ring to be elastically deformed to clamp and fix the lamp holder, and enable the lamp holder to be located at a center position of a connection with the lampshade.

In an embodiment, an included angle between the clamping arm and the sleeve ring is an obtuse angle.

In an embodiment, a plurality of clamping arms are provided, and the plurality of clamping arms are all connected with the lampshade.

In an embodiment, the lampshade is provided with an accommodating chamber, a stepped part is provided at a port of the accommodating chamber, and each of the plurality of clamping arms includes: a fixing part connected with the sleeve ring; an operating part provided at one end of the fixing part away from the sleeve ring, applying force to the operating part enabling the clamping arm to be elastically deformed; and a connecting part with one end connected with the fixing part and the other end connected with the operating part, the connecting part and the operating part and the fixing part forming clamping grooves, the clamping grooves being used for clamping the stepped part to fix the lamp holder and the lampshade.

In an embodiment, the lamp holder includes: a lamp holder body with a mounting chamber, a positive electrode conductive plate and a negative electrode conductive plate being provided in the mounting chamber, the light emitting unit being mounted in the mounting chamber and electrically connected with the positive electrode conductive plate and the negative electrode conductive plate; a power cord with a middle connected with the positive electrode conductive plate and the negative electrode conductive plate respectively, an end of the power cord being provided with a connector; and a bottom cover detachably assembled with the lamp holder body, the bottom cover being used for blocking one end of the lamp holder body away from the light emitting unit and tightly pressing and fixing the power cord.

In an embodiment, the lamp holder body is further provided with a fastening part and a fastening hole, and the bottom cover includes: a blocking part connected with the lamp holder body; an accommodating part connected with an end face of one side of the blocking part away from the light emitting unit;

- a fastening head stretching into the fastening hole and connected with the fastening part, so that the bottom cover is fixedly connected with the lamp holder body; and a pressing part abutted with the power cord, the pressing part tightly pressing and fixing the power cord onto the lamp holder body after the fastening head is connected with the fastening part.

In an embodiment, a positioning bump is provided at an edge of the blocking part, and a positioning groove adapted to the positioning bump is provided in the lamp holder body.

In an embodiment, the lamp holder body is provided with a clamping port, and the power cord is accommodated in the clamping port; and the pressing part is provided with a groove extending radially, the power cord is accommodated in the groove, and the clamping port is fit with the groove to limit the power cord.

In an embodiment, a first tip is provided on one side of the positive electrode conductive plate away from the light emitting unit, a second tip is provided on one side of the negative electrode conductive plate away from the light emitting unit, and both the first tip and the second tips are used for being inserted into the power cord to achieve electrical connection between the power cord and the positive electrode conductive plate and the negative electrode conductive plate.

By adopting the decorative lamp string provided in the embodiments of the present disclosure, the decorative lamps can be assembled, disassembled and spliced, so that users can splice to obtain a decorative lamp string with a required length according to the size of the scene. Moreover, during transportation, components are separated for transportation and storage, thus improving the convenience in transportation and storage. In addition, the lamp holder and lampshade are connected through connecting pieces, and detachable assembling between the lampshade and lamp holder is achieved, so that users can quickly change different lampshades according to different needs, thus improving the diversity and universality of the decorative lamp string.

BRIEF DESCRIPTION OF FIGURES

In order to describe more clearly the technical solutions in the embodiments of the present disclosure or the prior art, the following will briefly introduce the drawings needed in the description of the embodiments or the prior art. It is obvious that the drawings in the following description are only some embodiments of the present disclosure. Those of ordinary skills in the art may obtain other drawings from these drawings without contributing any inventive labor.

DETAILED DESCRIPTION

Figure 1:
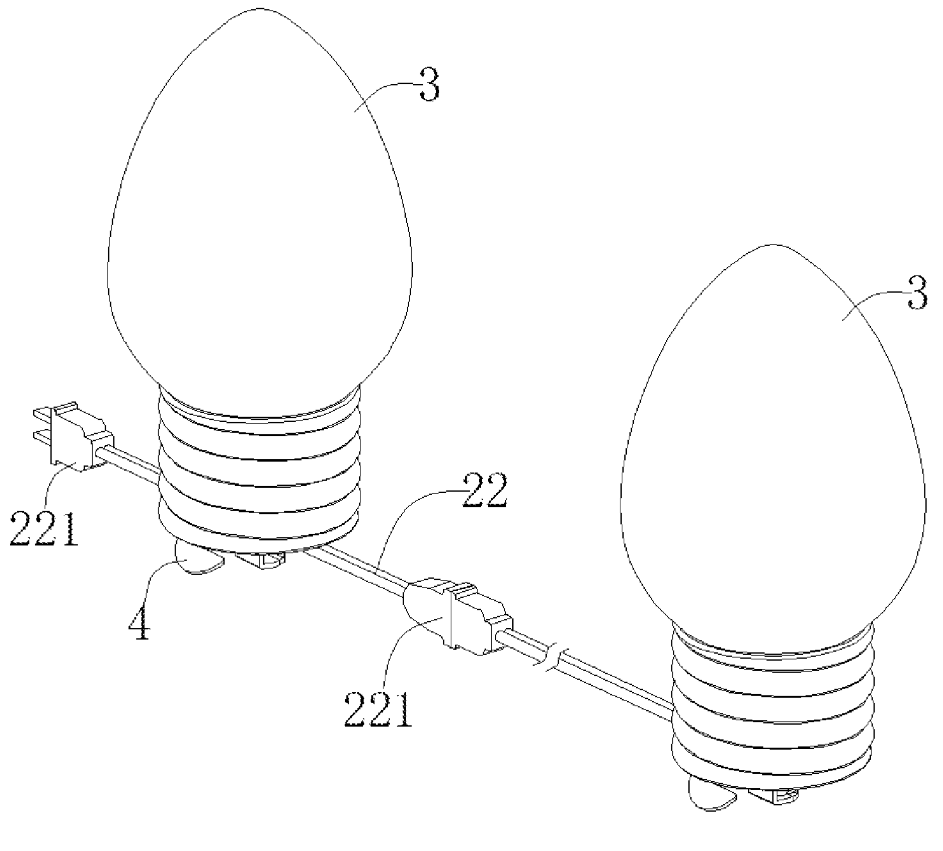
FIG. 1 illustrates a schematic structural diagram of a decorative lamp string in an embodiment of the present disclosure.
Figure 2:
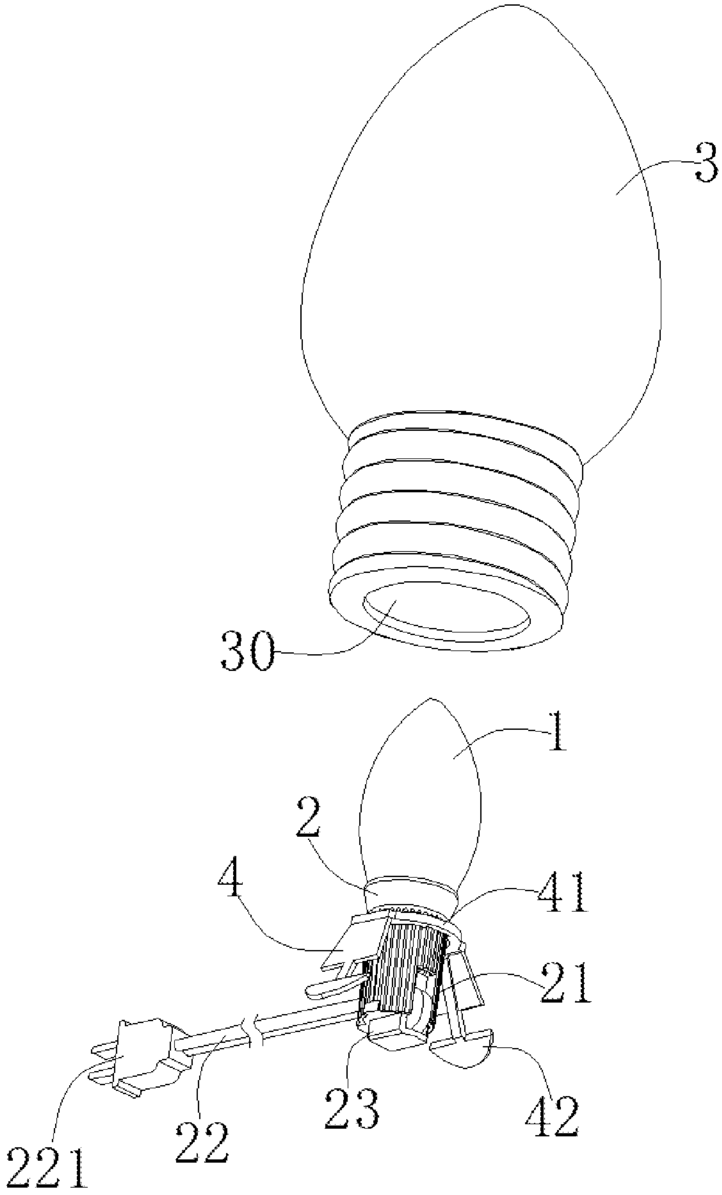
FIG. 2 illustrates a schematic structural diagram of a decorative lamp in an embodiment of the present disclosure.

The technical solutions in the embodiments of the present disclosure will be clearly and completely described below with reference to the drawings in the embodiments of the present disclosure. Apparently, the described embodiments are merely some rather than all of the embodiments of the present disclosure. All other embodiments obtained by those of ordinary skills in the art based on the embodiments of the present disclosure without contributing any inventive labor shall still fall within the scope of protection of the present disclosure.

In the description of the embodiments of the present disclosure, it is to be understood that, orientation or position relationships indicated by the terms such as "center", "up", "down", "left", "right", "vertical", "horizontal", "inside" and "outside" are based on orientation or position relationships shown in the drawings, and are used only for conveniently describing the embodiments of the present disclosure and simplifying the description, rather than indicating or implying that the mentioned apparatus or component must have a particular orientation or must be constructed and operated in a particular orientation. Therefore, such terms should not be construed as limitations to the embodiments of the present disclosure. In addition, terms such as "first", "second" and "third" are only used for the purpose of description and cannot be understood as indicating or implying relative importance.

In the description of the embodiments of the present disclosure, it is to be understood that unless otherwise explicitly specified and limited, the terms "mount", "connect" and "connection" should be understood in a broad sense. For example, it may be fixed connection, detachable connection or integral connection; it may be mechanical connection; it may also be electric connection; it may be direct connection; it may be connection through an intermediate medium; and it may be communication between two components. Those of ordinary skills in the art can understand specific meanings of the above terms in the embodiments of the present disclosure based on specific situations.

This embodiment relates to a decorative lamp string, which is mainly used in parks, squares, residential areas, streets, courtyards, and other places. Corresponding lampshade shapes can be changed according to different holiday scenes. For example, the Christmas tree lampshade is changed for Christmas, the skull lampshade is changed for Halloween, the pumpkin lampshade is changed for Halloween, and the lantern lampshade is changed for New Year's Eve.

It is to be understood that in this embodiment, the decorative lamp string includes a plurality of decorative lamps, and the plurality of decorative lamps can be combined in use by splicing, so that users can freely splice and use according to the required number of decorative lamps, thus improving the diversity and universality of the decorative lamp string. Below, description will be made by taking a single decorative lamp with a strawberry-shaped lampshade as an example.

Please refer to FIG. 1. In an embodiment, the decorative lamp mainly includes a light emitting unit 1, a lamp holder 2, a lampshade 3, and a connecting piece 4. Specifically, the light emitting unit 1 is energized to emit light to illuminate the lampshade. The light emitting unit 1 is detachably mounted on the lamp holder 2. Through the lamp holder 2, not only can adjacent decorative lamps be spliced, but it can also be connected with an external power supply to supply power for each decorative lamp. The lampshade 3 is connected with the lamp holder 2 through the connecting piece 4. The lampshade 3 is provided on the light emitting unit 1 in a covering manner, and the light emitted by the light emitting unit 1 illuminates the lampshade 3 to achieve the effect of creating an atmosphere and decorating the environment. One part of the connecting piece 4 is provided on the lamp holder 2 in a sleeving manner and the other part is connected with the lampshade 3, so as to achieve detachable assembling between the lampshade 3 and the lamp holder 2.

It is to be understood that through the arrangement of the connecting piece 4, the lampshade 3 and the lamp holder 2 can be assembled and disassembled, and different lampshades 3 can be changed according to different holiday scenes, thus not only improving the diversity of the decorative lamp string, but also enhancing its applicability, and making it suitable for more scenes. In addition, the arrangement of the connecting piece 4 makes it very easy to disassemble and assemble the lampshade 3 and the lamp holder 2, thus helping users to quickly change the lampshade 2 and further improving the practicability of the decorative lamp string.

Please refer to FIG. 2 to FIG. 6. In an embodiment, the lamp holder 2 includes a lamp holder body 21, a power cord 22, and a bottom cover 23. Specifically, the lamp holder body 21 is provided with a mounting chamber 210, and a positive electrode conductive plate 211 and a negative electrode conductive plate 212 are provided in the mounting chamber 210. The light emitting unit 1 is connected with one side of the mounting chamber 210 away from the bottom cover 23, and is electrically connected with the positive electrode conductive plate 211 and the negative electrode conductive plate 212. The middle of the power cord 22 is connected with the positive electrode conductive plate 211 and the negative electrode conductive plate 212 respectively. An end of the power cord 22 is provided with a connector 221. The connector 221 is used for connecting adjacent lamp holder bodies 21 and can be connected with an external power supply to supply power to the decorative lamp string. The bottom cover 23 is detachably assembled with the lamp holder body 21 and is used for blocking one end of the mounting chamber 210 of the lamp holder body 21. When the bottom cover 23 is connected with the lamp holder body 21, it can also tightly press and fix the power cord 22.

In an embodiment, a mounting platform 213 is provided on one side of the mounting chamber 210 close to the bottom cover 23, and the mounting platform 213 is connected with an inner wall of the mounting chamber 210. A mounting groove (not shown) is provided in the middle of the mounting platform 211. The positive electrode conductive plate 211 is mounted in the mounting groove. One end of the positive electrode conductive plate 211 is connected with the power cord 22, and the other end is connected with an end face of one side of the light emitting unit 1 close to the bottom cover 23. A sidewall of the mounting chamber 210 is provided with a socket (not shown) that extends along an axis direction of the lamp holder body 21. The negative electrode conductive plate 212 is inserted into the socket and is connected with the lamp holder body 21. One end of the negative electrode conductive plate 212 is connected with the power cord 22, and the other end is connected with a sidewall of a head part of the light emitting unit 1.

It is to be understood that in this embodiment, the connector 221 is a power plug and a power socket that can be adapted to each other. When a plurality of decorative lamps are spliced to form a decorative lamp string, the arrangement of the connector 221 can achieve connection between adjacent decorative lamps through a power plug and a power socket of another decorative lamp, and so on, thus forming a decorative lamp string. By adopting such arrangement of the decorative lamp string, the decorative lamps can be spliced according to the length of the required lamp string, thus making it simple and convenient to use. It is to be specially understood that only one end of the power cord 22 of the decorative lamp located at the tail end of the decorative lamp string is provided with a connector 221, while the other end is accommodated in the bottom cover 23 to prevent the end of the power cord 22 from being exposed. In other embodiments, the connector 221 may also be a USB plug and a USB socket that can be adapted to each other. In other words, the connector 221 only needs to meet the requirements of connection and conduction.

Please continue to refer to FIG. 2 to FIG. 6. In an embodiment, a first tip 2111 is provided on one side of the positive electrode conductive plate 212 away from the light emitting unit 1, and a second tip 2121 is provided on one side of the negative electrode conductive plate 212 away from the light emitting unit 1. When the bottom cover 23 is fastened with the lamp holder body 21, the bottom cover 23 squeezes the power cord 22 towards one side of the light emitting unit 1, causing the first tip 2111 and the second tip 2121 to pierce into different wires inside the power cord 22 and to be connected with the conductive parts of the wires, achieving electrical connection between the power cord 22 and the positive electrode conductive plate 211 and the negative electrode conductive plate 212, and thus achieving electrical connection between the light emitting unit 1 and the power cord 22. Such arrangement can greatly improve the convenience in mounting the power cord 22 and the lamp holder body 21, which is conducive to the production and assembling of decorative lamps.

In an embodiment, the lamp holder body 21 is further provided with a fastening part 214 and a fastening hole 215. The fastening part 214 is located on one side of the fastening hole 215 away from the bottom cover 23. A part of the bottom cover 23 passes through the fastening hole 215 and is fastened with the fastening part 214, so that the bottom cover 23 is detachably connected with the lamp holder body 21.

In an embodiment, the bottom cover 23 includes a blocking part 231, an accommodating part 232, a fastening head 233, and a pressing part 234. Specifically, the blocking part 231 is connected with one side of the lamp holder body 21 away from the light emitting unit 1 to block one end of the mounting chamber 210. The accommodating part 232 is connected with an end face of one side of the blocking part 231 away from the light emitting unit 1. The accommodating part 232 is used for accommodating the end of the power cord 22 of the tail decorative lamp, so as to prevent the end of the power cord 22 from being exposed, and ensure the use safety and the overall aesthetics of the decorative lamp string. The fastening head 233 passes through the fastening hole 215 and is abutted with the fastening part 214, so that the bottom cover 23 and the lamp holder body 21 are detachably fixed. The pressing part 234 is provided on one side of the blocking part 231 close to the light emitting unit 1. The pressing part 234 tightly presses and fixes the power cord 22 onto the lamp holder body 21 after the fastening head 233 is connected with the fastening part 214.

It is to be understood that in this embodiment, the accommodating part 232 is provided with an accommodating groove 2321. The end of the power cord 22 of the tail decorative lamp is accommodated in the accommodating groove 2321, so as to ensure the overall aesthetics of the lamp holder, prevent the end of the power cord 22 from being exposed, and ensure the use safety of the decorative lamp string. A limiting part 216 is provided on one side of the lamp holder body 21 close to the bottom cover 23. When the fastening head 233 is fit with the fastening part 214, the blocking part 231 is abutted with the limiting part 216. On the one hand, it can prevent the blocking part 231 from being completely mounted into the mounting chamber 210, and make the end face of one side of the blocking part 231 away from the light emitting unit 1 flush with the end face of one side of the lamp holder body 21 away from the light emitting unit 1, thus further improving the aesthetics of the overall assembly of the lamp holder 2. On the other hand, it can make the fastening head 233 and the fastening part 214 fastened tightly, thus preventing the fastening head 233 from extending too long and losing the fastening effect.

It is to be also understood that two fastening heads 233 are provided, and correspondingly, two fastening holes 215 and two fastening parts 214 are provided. In this embodiment, fixed ends of the fastening heads 233 are connected with the blocking part 231, and free ends extend towards the side where the light emitting unit 1 is located. The free ends of the two fastening heads 233 slightly extend outward towards opposite sides, so that the free ends of the fastening heads 233 can be quickly clamped into the fastening parts 214 after stretching out of the fastening holes 215, thus improving the firmness of mounting.

Figure 4:
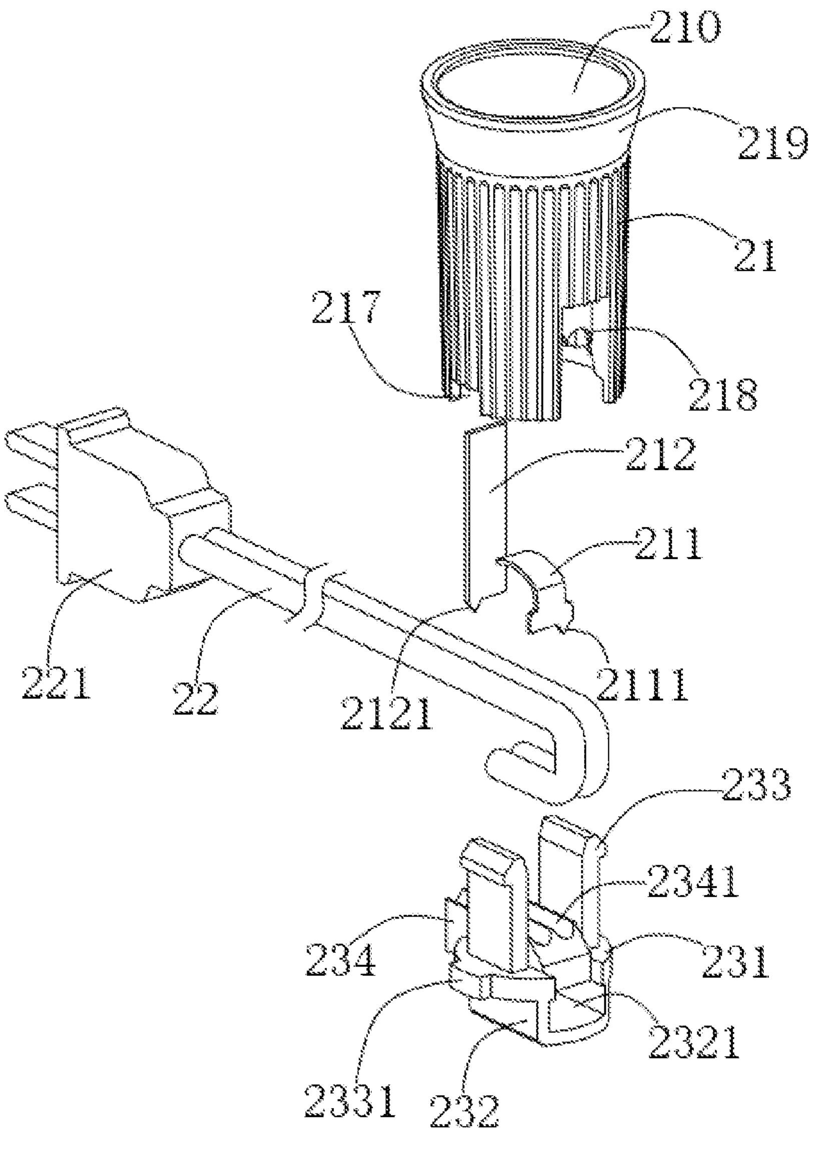
FIG. 4 illustrates an exploded diagram of a lamp holder in an embodiment of the present disclosure.
Figure 5:
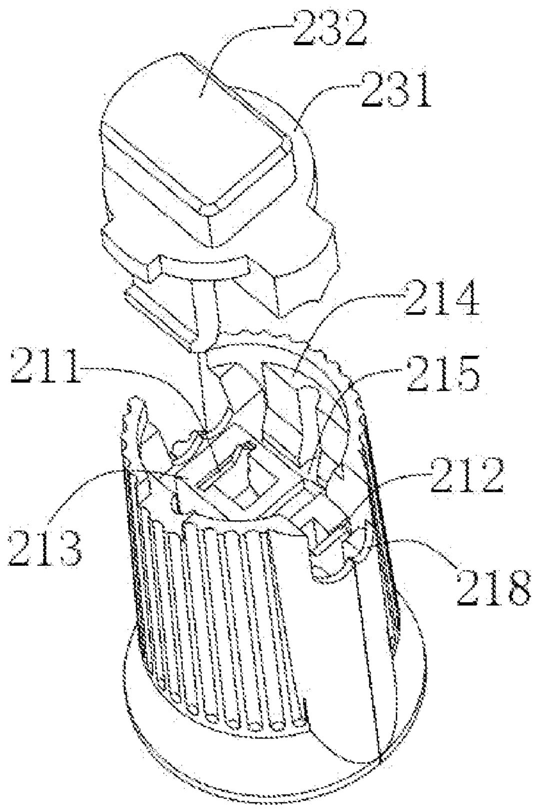
FIG. 5 illustrates a schematic structural diagram of a lamp holder body and a bottom cover in an embodiment of the present disclosure.
Figure 6:
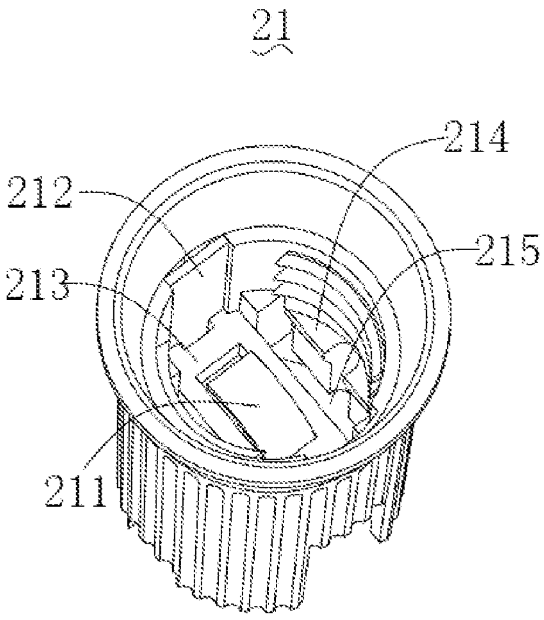
FIG. 6 illustrates a schematic structural diagram of a lamp holder body in an embodiment of the present disclosure.

Please refer to FIG. 4. In an embodiment, a positioning block 2311 is provided on the blocking part 231, and a positioning groove 217 is provided in the lamp holder body 21. When the lamp holder body 21 and the bottom cover 23 are assembled, the fitting between the positioning block 2311 and the positioning groove 217 is conducive to the quick disassembling and assembling of the lamp holder body 21 and the bottom cover 23, thus improving the convenience in disassembling and assembling.

In an embodiment, the pressing part 234 is located between two fastening heads 233, and a groove 2341 extending radially is provided in one side of the pressing part 234 away from the blocking part 231. A clamping port 218 is provided in the lamp holder body 21. The power cord 22 is clamped into the clamping port 218. After the bottom cover 23 and the lamp holder body 21 are assembled, the groove 2331 is fit with the clamping port 218 to limit the power cord 22.

It is to be understood that two ends of the pressing part 234 protrude from the sidewall of the blocking part 231. After the bottom cover 23 and the lamp holder body 21 are assembled, two ends of the pressing part 234 are basically flush with the outer sidewall of the lamp holder body 21 to ensure the tightness and aesthetics of the combination between the bottom cover 23 and the lamp holder body 21.

Figure 3:
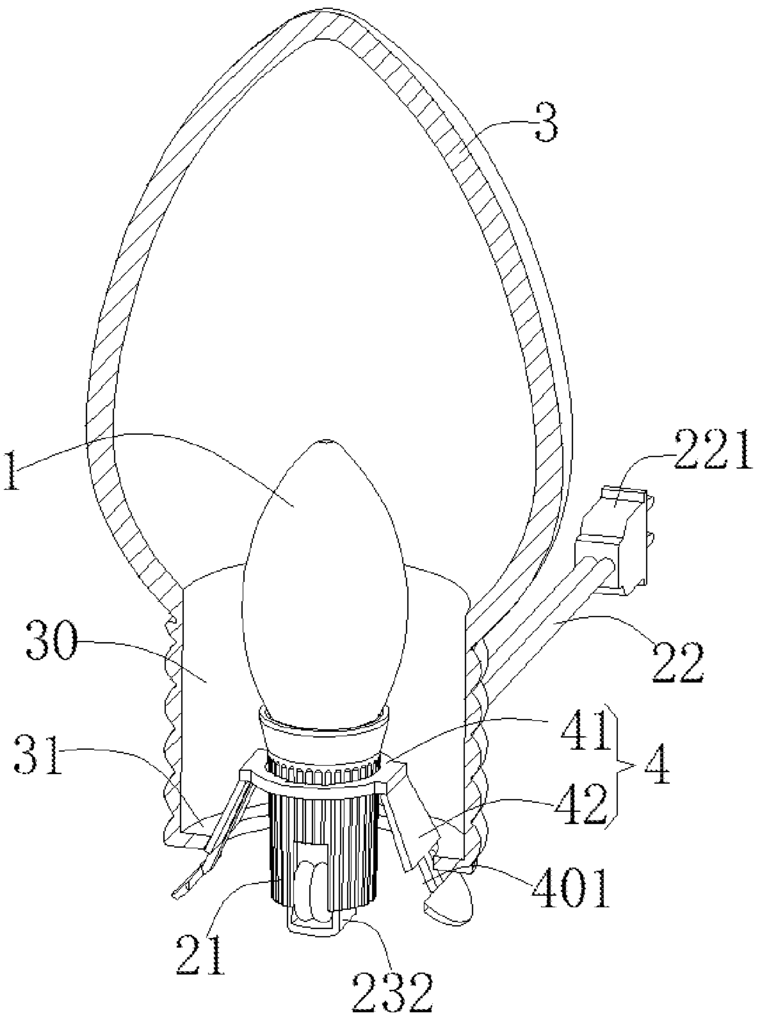
FIG. 3 illustrates a schematic structural diagram after a lampshade is sectioned in an embodiment of the present disclosure.
Figure 7:
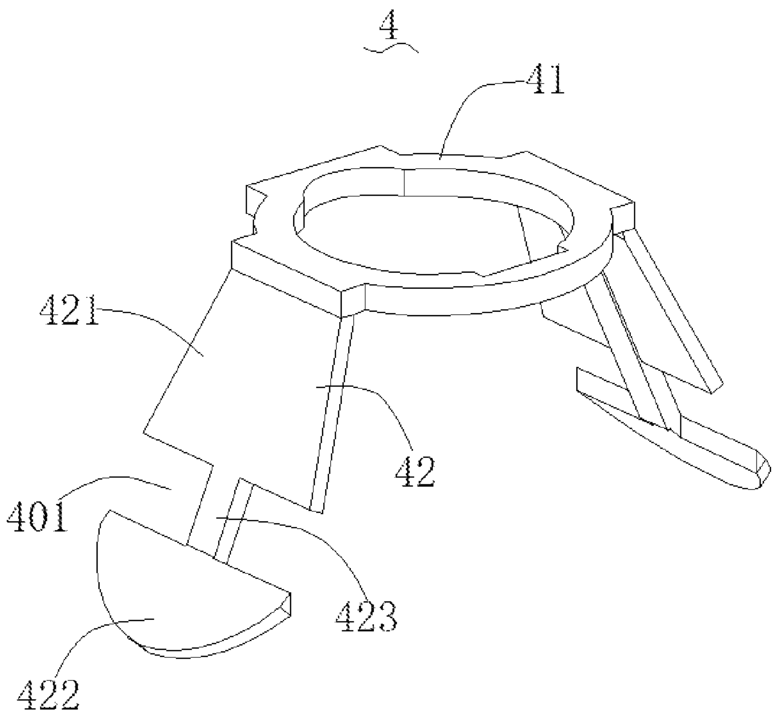
FIG. 7 illustrates a schematic structural diagram of a connecting piece in an embodiment of the present disclosure.
Figure 8:
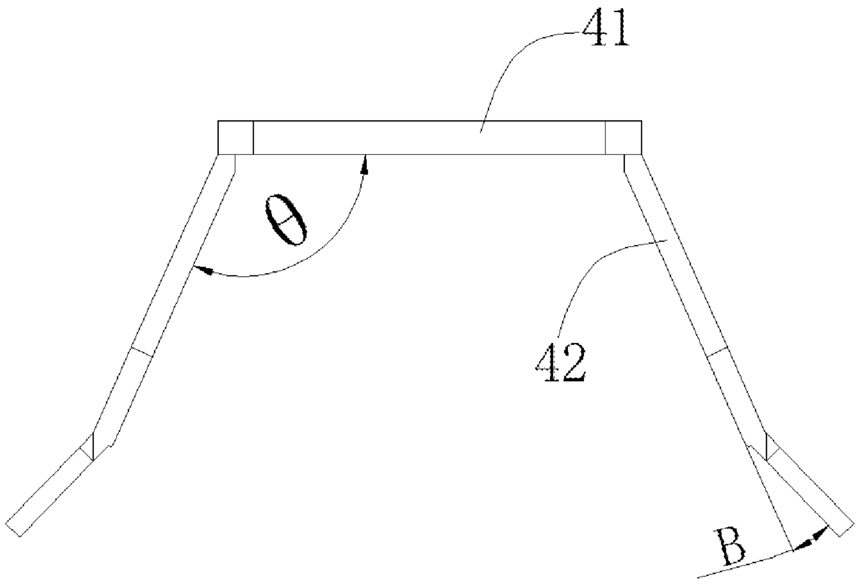
FIG. 8 illustrates a front view corresponding to FIG. 7.

Please refer to FIG. 3, FIG. 7 and FIG. 8. In an embodiment, the connecting piece 4 includes a sleeve ring 41 and a clamping arm 42. Specifically, the sleeve ring 41 is provided on the lamp holder 2 in a sleeving manner, and the sleeve ring 41 is elastically deformable. The clamping arm 42 has elasticity. One end is connected with the sleeve ring 41, and the other end is able to get away from or close to the lamp holder 2 through elastic deformation under the effect of an external force to enable the sleeve ring 41 to be elastically deformed to clamp and fix the lamp holder 2. Meanwhile, the clamping arm 42 can enable the lamp holder 2 to be located at a center position of a connection with the lampshade 3, so as to ensure the uniformity of the illumination of the light emitting unit 1 on the lampshade 3, thus ensuring the overall aesthetics of the decorative lamp string.

It is to be understood that a plurality of axially extending grooves are provided on the outer sidewall of the lamp holder body 21 to increase the friction force of the outer sidewall of the lamp holder body 21 and improve the stability of clamping between the sleeve ring 41 and the lamp holder body 21. In addition, a flared part 219 is further provided on one side of the lamp holder body 21 close to the light emitting unit 1, and the radial size of the flared part 219 is larger than the inner diameter of the sleeve ring 41, effectively preventing the lamp holder body 21 from being separated from the sleeve ring 41.

In an embodiment, an included angle θ between the clamping arm 42 and the sleeve ring 41 is an obtuse angle. Such arrangement allows a distal end of the clamping arm 42 to be expandable outwards, so that it can be conveniently clamped with the lampshade 3. The specific included angle θ may be selected as long as the clamping arm 42 can be clamped with the lampshade 3.

In an embodiment, a plurality of clamping arms 42 are provided, and the plurality of clamping arms 42 are all connected with the lampshade 3. In addition, the plurality of clamping arms 42 are centrosymmetrically provided around a center of the sleeve ring 41. The arrangement of a plurality of clamping arms 42 can improve the reliability of the connection between the lampshade 3 and the lamp holder 2.

In an embodiment, the lampshade 3 is provided with an accommodating chamber 30, and a stepped part 31 is provided at a port of the accommodating chamber 30. The clamping arm 41 is clamped with the stepped part 31 to achieve detachable connection between the lamp holder 2 and the lampshade 3.

Please continue to refer to FIG. 3, FIG. 7 and FIG. 8. In an embodiment, the clamping arm 42 includes a fixing part 421, an operating part 422, and a connecting part 423. Specifically, the fixing part 421 is trapezoidal and connected with the sleeve ring 41. The operating part 422 is located on one side of the fixing part 421 away from the sleeve ring 41. Applying force to the operating part 422 can enable the clamping arm 42 to be elastically deformed, so that the clamping arm 42 can be clamped into the accommodating chamber 30. One end of the connecting part 423 is connected with the fixing part 421 and the other end is connected with the operating part 422. The connecting part 423, the operating part 422 and the fixing part 421 form two clamping grooves 401. The two clamping groove 401 are used for clamping the stepped part 31 to fix the lamp holder 2 and the lampshade 3.

It is to be understood that in this embodiment, two clamping arms 42 are provided. When the lampshade 3 is connected with the lamp holder 2 through the connecting piece 4, the clamping arms 42 are in a squeezed state. In this way, only through the elasticity of the clamping arms 42 can the clamping grooves 401 be clamped with the stepped part 31, thus achieving detachable assembling between the lamp holder 2 and the lampshade 3. In addition, the operating part 422 is expanded outwards. An included angle β formed between the operating part and the fixing part 421 is an acute angle. The operating part 422 in such arrangement can conveniently drive the clamping arm 42 to be elastically deformed, thus further improving the convenience in assembling and disassembling the lampshade 3.

When the decorative lamp is assembled, firstly the power cord 22 is clamped into the fastener, then the clamping head 233 is threaded into the clamping hole 215, the blocking part 231 is enabled to press against the limiting part 216, and the clamping head 233 is clamped with the clamping part 214. At this time, under the squeezing effect of the pressing part 234, the power cord 22 is pierced by the positive electrode conductive plate 212 and the negative electrode conductive plate 213 to achieve electrical connection. Then, the light emitting unit 1 is connected with the lamp holder 2, and the lamp holder 2 is threaded into the sleeve ring 41. Then, the clamping arms 42 are squeezed to enable the light emitting unit 1, a part of the lamp holder 2 and a part of the connecting piece 4 to enter the accommodating chamber 30. When the clamping groove 401 is aligned with the stepped part 31, the clamping arms 42 are released, so that the clamping arms 42 press against the stepped part 31 under their own elastic force, and the clamping groove 401 is clamped with the stepped 31, thus completing the assembling of the decorative lamp. Finally, a plurality of decorative lamps are spliced together through the connectors 221 to form a decorative lamp string.

By adopting the above decorative lamp string, it is very easy to disassemble and assemble the lampshade 3 and the lamp holder 2, so that users can quickly change different lampshades 3 according to different needs, thus improving the diversity and universality of the decorative lamp string. In addition, the decorative lamps can be assembled, disassembled and spliced, so that users can splice to obtain a decorative lamp string with a required length according to the size of the scene. Moreover, during transportation, components are separated for transportation and storage, thus improving the convenience in transportation and storage.

What are described above are only used for describing the technical solution of the present disclosure, instead of limiting it. Any other modifications or equivalent replacements made by those of ordinary skills in the art to the technical solution of the present disclosure as long as they do not deviate from the spirit and scope of the technical solution of the present disclosure, should also be included in the scope of the claims of the present disclosure.

What is claimed is:

1. A decorative lamp string, comprising a plurality of spliceable decorative lamps, each decorative lamp comprising: a light emitting unit; a lamp holder connected with the light emitting unit and used for connecting adjacent decorative lamps or being connected with an external power supply; a lampshade connected with the lamp holder and provided on the light emitting unit in a covering manner; and a connecting piece with one part provided on the lamp holder in a sleeving manner and the other part connected with the lampshade, the connecting piece being used for achieving detachable assembling between the lampshade and the lamp holder; wherein the lampshade is provided with an accommodating chamber, a stepped part is provided at a port of the accommodating chamber, and each of the plurality of clamping arms comprises: a fixing part connected with the sleeve ring; an operating part provided at one end of the fixing part away from the sleeve ring, applying force to the operating part enabling the clamping arm to be elastically deformed; and a connecting part with one end connected with the fixing part and the other end connected with the operating part, the connecting part and the operating part and the fixing part forming clamping grooves, the clamping grooves being used for clamping the stepped part to fix the lamp holder and the lampshade.

2. The decorative lamp string according to claim 1, wherein the connecting piece comprises:

a sleeve ring provided on the lamp holder in a sleeving manner and being elastically deformable; and a clamping arm with elasticity, one end of the clamping arm being connected with the sleeve ring, the other end being able to get away from or close to the lamp holder to enable the sleeve ring to be elastically deformed to clamp and fix the lamp holder, and enable the lamp holder to be located at a center position of a connection with the lampshade.

3. The decorative lamp string according to claim 1, wherein the lamp holder comprises:

a lamp holder body with a mounting chamber, a positive electrode conductive plate and a negative electrode conductive plate being provided in the mounting chamber, the light emitting unit being mounted in the mounting chamber and electrically connected with the positive electrode conductive plate and the negative electrode conductive plate;

a power cord with a middle connected with the positive electrode conductive plate and the negative electrode conductive plate respectively, an end of the power cord being provided with a connector; and a bottom cover detachably assembled with the lamp holder body, the bottom cover being used for blocking one end of the lamp holder body away from the light emitting unit and tightly pressing and fixing the power cord.

4. The decorative lamp string according to claim 2, wherein an included angle between the clamping arm and the sleeve ring is an obtuse angle.

5. The decorative lamp string according to claim 4, wherein a plurality of clamping arms are provided, and the plurality of clamping arms are all connected with the lampshade.

6. The decorative lamp string according to claim 3, wherein the lamp holder body is further provided with a fastening part and a fastening hole, and the bottom cover comprises:

a blocking part connected with the lamp holder body;

an accommodating part connected with an end face of one side of the blocking part away from the light emitting unit;

a fastening head stretching into the fastening hole and connected with the fastening part, so that the bottom cover is fixedly connected with the lamp holder body; and a pressing part abutted with the power cord, the pressing part tightly pressing and fixing the power cord onto the lamp holder body after the fastening head is connected with the fastening part.

7. The decorative lamp string according to claim 3, wherein a first tip is provided on one side of the positive electrode conductive plate away from the light emitting unit, a second tip is provided on one side of the negative electrode conductive plate away from the light emitting unit, and both the first tip and the second tips are used for being inserted into the power cord to achieve electrical connection between the power cord and the positive electrode conductive plate and the negative electrode conductive plate.

8. The decorative lamp string according to claim 6, wherein a positioning bump is provided at an edge of the blocking part, and a positioning groove adapted to the positioning bump is provided in the lamp holder body.

9. The decorative lamp string according to claim 8, wherein the lamp holder body is provided with a clamping port, and the power cord is accommodated in the clamping port; and the pressing part is provided with a groove extending radially, the power cord is accommodated in the groove, and the clamping port is fit with the groove to limit the power cord.

* * * * *